United States Patent [19]
van den Nieuwelaar et al.

[11] Patent Number: 5,123,871
[45] Date of Patent: Jun. 23, 1992

[54] DEVICE FOR CUTTING OUT THE VENT OF SLAUGHTERED POULTRY

[75] Inventors: Adrianus J. van den Nieuwelaar, Gemert; Petrus C. M. Janssen, Wilbertoord, both of Netherlands

[73] Assignee: Stork PMT B.V., Boxmeer, Netherlands

[21] Appl. No.: 711,448

[22] Filed: Jun. 6, 1991

[30] Foreign Application Priority Data

Jun. 8, 1990 [NL] Netherlands ............... 9001308

[51] Int. Cl.[5] ........................... A22C 21/06
[52] U.S. Cl. ........................ 452/122; 452/120
[58] Field of Search ........... 452/122, 120, 106, 109

[56] References Cited

U.S. PATENT DOCUMENTS

| | | | |
|---|---|---|---|
| 2,943,346 | 7/1960 | Jensen | 17/11 |
| 4,023,237 | 5/1977 | Meyn | 452/122 |
| 4,564,977 | 1/1986 | Scheier et al. | 452/109 |

FOREIGN PATENT DOCUMENTS

| | | |
|---|---|---|
| 8625835 | 2/1987 | Fed. Rep. of Germany . |
| 156025 | 7/1978 | Netherlands . |
| 2147190 | 5/1985 | United Kingdom . |

Primary Examiner—Willis Little
Attorney, Agent, or Firm—Hurt, Richardson, Garner, Todd & Cadenhead

[57] ABSTRACT

A device for making an incision around the vent of a slaughtered bird and pulling the end of the rectum out of the opening thus made, including: a centering pin which is movable relative to the bird, and is provided with a thickened end portion; and a cylindrical rotary cutter with an annular cutting edge, which cutter is movable relative to the bird and is movable coaxially relative to the centering pin. The device further comprises one or more holding elements which are recessed relative to the cutting edge and which can interact with a contacting surface of the thickened centering pin end portion situated opposite them for holding the vent between these elements and the contacting surface near or at the orbicular muscle. The drive of the cutter is designed in such a way that the cutter carries out a small number of turns during the cutting operation. The holding elements may be made in the form of one or more pins which project axially with the cutter towards its cutting edge, and which are intended for piercing the vent near or at the orbicular muscle. A holding element may also consist of a principally annular protuberance along the inner circumference of the cutter.

8 Claims, 5 Drawing Sheets

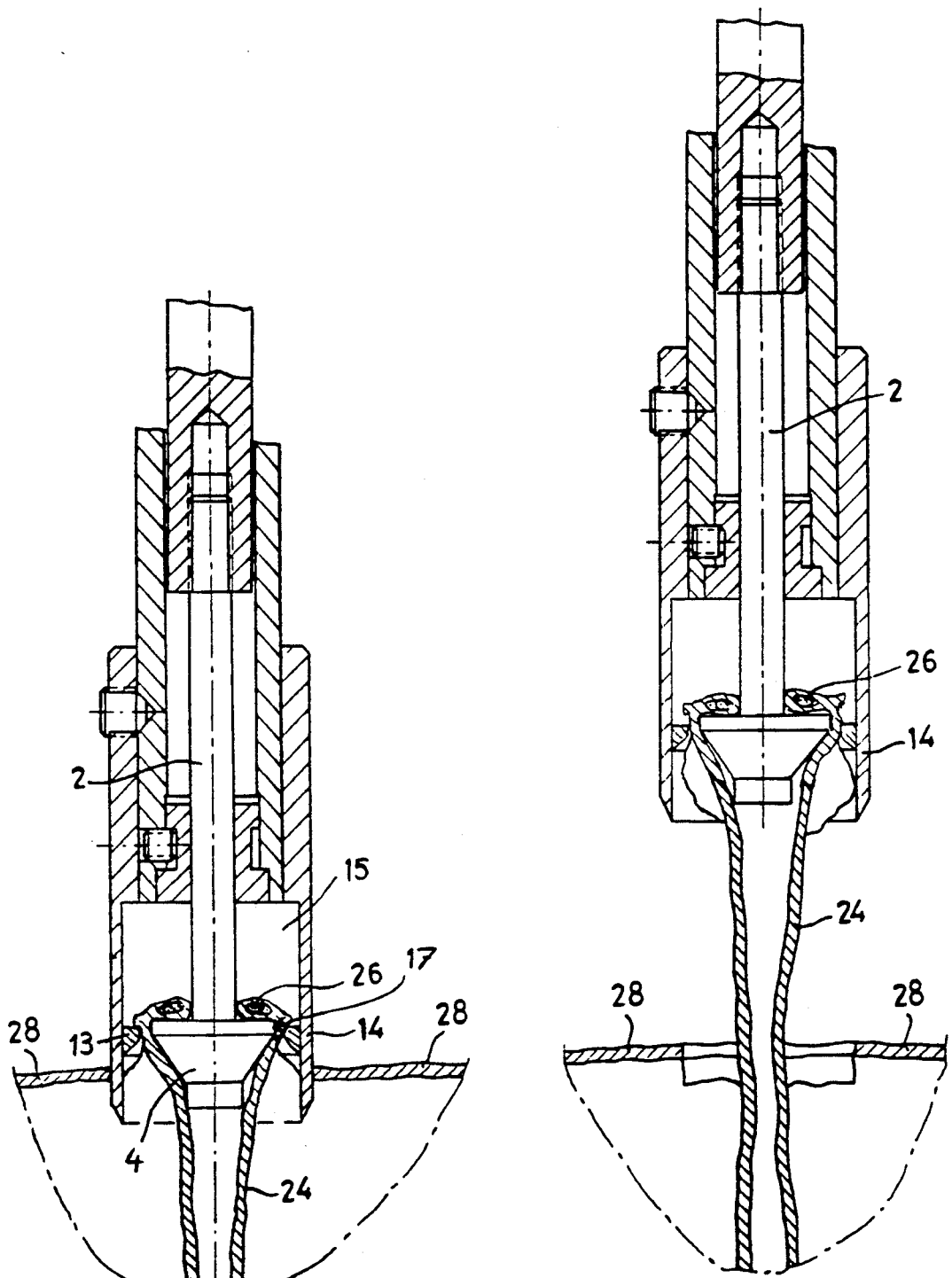

DEVICE FOR CUTTING OUT THE VENT OF SLAUGHTERED POULTRY

BACKGROUND OF THE INVENTION

This invention relates to a device for making an incision around the vent of a slaughtered bird and pulling the end of the rectum out of the opening thus made, comprising: a centering pin for insertion into the vent of the bird, which centering pin is movable relative to the bird, and is provided with a thickened end portion; and a cylindrical rotary cutter with an annular cutting edge, which cutter is movable relative to the bird and is movable coaxially relative to the centering pin.

DISCUSSION OF THE PRIOR ART

Devices for cutting out the vent of slaughtered poultry are known and are all generally handled or controlled in the same way: for a start, the centring pin is inserted into the vent of the slaughtered bird in order to serve as a reference for the cutter and to obtain an incision which is properly centered around the vent. The vent is then fixed by means of fixing means, and the fixing means and the cutting edge of the generally continuously rotating cutter are moved towards each other, either by moving the cutter towards the fixing means, or by moving the fixing means towards the cutter. The cutter then makes an incision around the vent, following which the end of the rectum can be pulled out of the opening thus made, the fixing is undone, and the centring pin is removed from the vent.

A known device in which the method described above is used is described in, for example, Netherlands Patent 156,025. According to this publication, the vent is clamped between two faces and thereby fixed prior to the making of the incision, the first face being the surface of the thickened end portion of the centring pin facing the cutter, and the second face being a surface of a clamping sleeve which is movable coaxially relative to the cutter. For the operation of the device it is necessary to control the movements of not only the centring pin, but also the cutter and the clamping sleeve relative to each other in a coordinated manner. In view of the number of parts to be controlled, and the movements to be carried out, this is complex and expensive.

In U.S. Pat. No. 2,943,346 a device of the abovementioned type is described, having fixing means rigidly connected to the centering pin. The control of this device is consequently less complex than that of the device discussed above, but a major disadvantage is the use of partial vacuum in the fixing of the vent. Since the partial vacuum is active on the vent and its environment, the fixing means quickly become soiled with faeces which are sucked away, so that the device cannot meet the hygienic standards which are to be set.

SUMMARY OF THE INVENTION

It is now the object of the invention to provide a device for cutting out the vent which comprises few elements to be controlled and holds the vent with the aid of mechanical means.

This object is attained according to the invention by a device which comprises one or more holding elements which are recessed relative to the cutting edge and which can cooperate with a contacting surface of the thickened centering pin end portion situated opposite them for holding the vent between these elements and the contacting surface near or at the orbicular muscle.

In the case of the device according to the invention, the sequence of operations customary hitherto during the cutting out of the vent of a bird is changed: although the centering pin is first of all inserted into the vent of the bird in the known manner, the incision around the vent is then made first before the vent is held fast between the holding element(s) and the contacting surface of the thickened centering pin end portion.

Holding the vent fast after the making of the incision means that it is possible to pull the end of the rectum out of the opening made by the incision over a particular distance out of the bird, as is usual as a preparation for removal of the viscera from the bird.

Since in the operation of the device according to the invention the vent is not held fast during the making of the incision, the cutter is preferably rotated only over a small number of turns during the making of the incision. The end of the rectum cut away is thus prevented from rotating with the cutter over a large number of turns while the bird is fixed, a rotation which could lead to damage of the viscera of the bird, and faeces contaminating the meat to be obtained. Many solutions for achieving a limited rotation of the cutter are known to one skilled in the art, one of these solutions, by way of example, being a cog wheel construction.

The holding by the cooperating holding elements and the contacting surface in a preferred embodiment of the device according to the invention takes place by making the holding elements in the form of one or more pins which project axially with the cutter towards its cutting edge, and which are intended for piercing the vent near or at the orbicular muscle. The pin(s) hold(s) the vent which is placed over the thickened end portion of the centering pin in a particularly efficient and secure manner.

The contracting surface of the centering pin end portion is preferably provided with recesses for receiving the pins, as a result of which the vent can be pierced completely at the orbicular muscle, which produces a further improved grip on the vent.

These recesses preferably consist of holes, in the case of which the contacting surface of the centering pin end portion is set up in a fixed manner in the tangential direction relative to the pins.

Apart from the above or in conjunction with it, the vent near or at the orbicular muscle can be clamped in an advantageous manner between a contacting surface of the holding elements and the contacting surface of the centering pin end portion.

A holding element of the device according to the invention may consist of a principally annular protuberance along the inner circumference of the cutter. The protuberance provides a steady support of the cut-out vent, in particular when the difference between the inner radius of the protuberance and the largest outer radius of the thickened centring pin end portion is smaller than the thickness of the orbicular muscle. The protuberance and the cutter may constitute an entity or may be made separately and connected solidly.

Finally, when a small number of turns of the cutter is carried out, it is very advantageous to provide the cutter with a serrated cutting edge.

The claims and advantages will be more readily appreciated as the same becomes better understood by reference to the following detailed description and con-

DESCRIPTION OF THE DRAWINGS

FIGS. 6-9 show another embodiment of the device according to the invention in successive working positions analogous to FIGS. 1-4, respectively, during the making of an incision around the vent of a slaughtered bird and pulling the end of the rectum out of the opening thus made; and FIG. 10 shows an embodiment of the cutting edge of the cutter in the device according to the invention.

DESCRIPTION OF THE PREFERRED EMBODIMENTS

Figure 1:
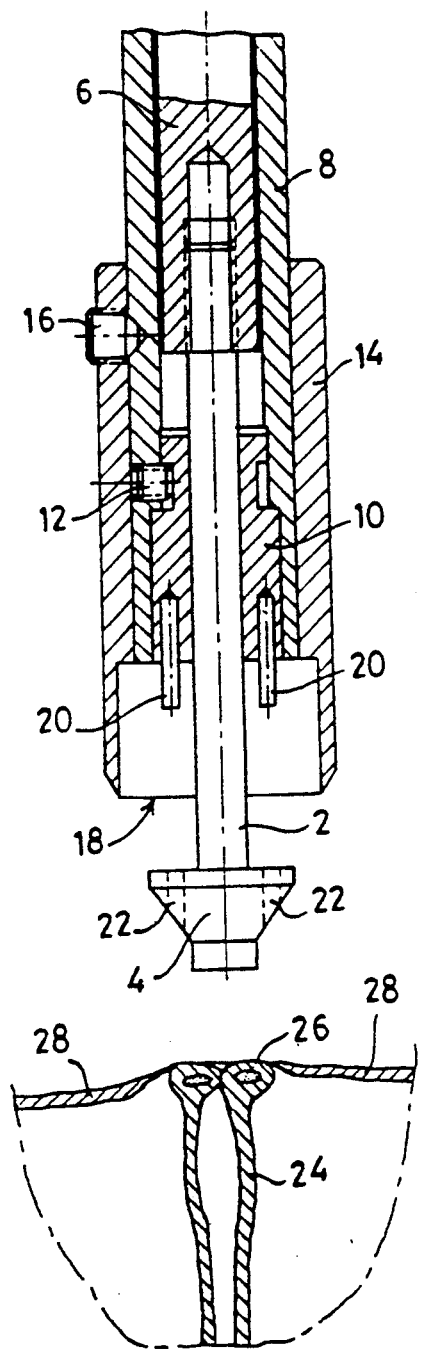
FIG. 1 shows a partial longitudinal section of a preferred embodiment of the device according to the invention, positioned above a bird, the vent of which is shown in partial cross-section.

FIG. 1 shows a centering pin 2, provided with a thickened, largely conical end portion 4, and at the other end screwed into a rod 6, which is movable in the vertical direction and is driven by a first controlled drive device which is not shown in any further detail.

The rod 6 is mounted so that it is axially slidable in a cylinder 8, inside which a plug 10 is fixed by means of a locking screw 12. A central hole in the plug 10 forms the axial guide for the centering pin 2. The cylinder 8 is movable in the vertical direction and is driven by a second controlled drive device which is not shown in any further detail.

A cylindrical cutter 14, provided with a cutting edge 18, is disposed around the cylinder 8 and is rigidly connected thereto by means of a locking screw 16.

Pressed into the plug 10 by way of holding elements are two pins 20, in line with which there are two through holes 22 in the thickened end portion 4 of the centering pin 2, which holes can take the pins when the end portion 4 moves towards the plug 10. It is assumed here that end portion 4 can move relative to plug 10 in the axial direction, but not in the tangential direction.

Below the centering pin end portion 4 is the vent of a bird, the rectum of the bird being indicated by 24, which rectum ends at the vent with the orbicular muscle 26 on the skin surface 28.

Figure 2:
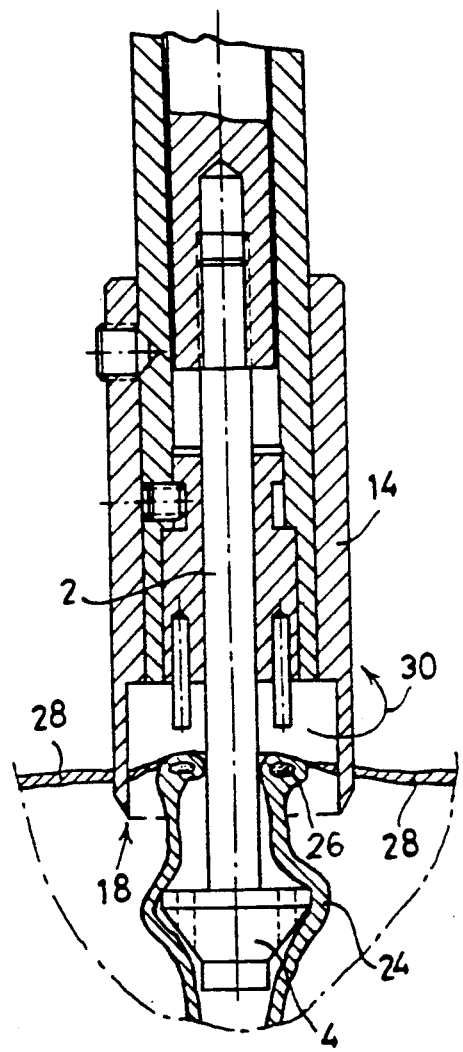
FIGS. 2-5 show the device according to FIG. 1 in successive working positions during the making of an incision around the vent of a slaughtered bird and pulling the end of the rectum out of the opening thus made.

FIG. 2 shows the stage of operation at which the elements shown in FIG. 1 have moved down as a whole. During the downward movement the end portion 4 of the centering pin 2 first of all penetrates into the rectum 24, after which on continuation of the movement the cutting edge 18 of the cutter 14 rotating in the direction of the arrow 30 cuts through the skin 28 into the underlying tissue around the vent of the bird. The orbicular muscle 26 grips round the centering pin 2, which—as a result of the fixed arrangement in the tangential direction—also rotates relative to the cutter 14 at an angular speed which is equal to that of cutter 14.

Figure 3:
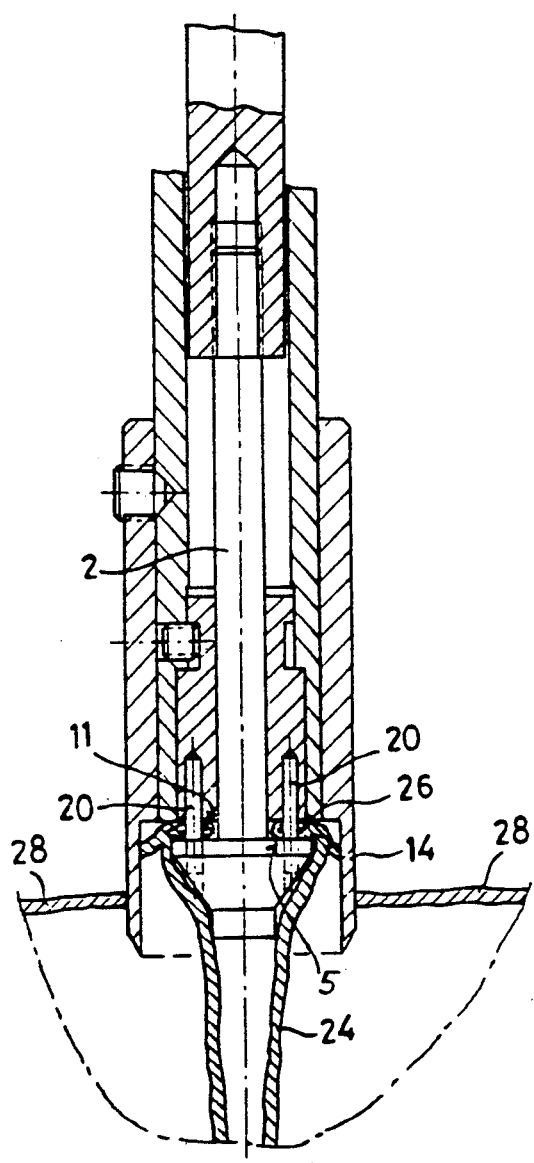

In FIG. 3 the centring pin 2 is moved up relative to the position shown in FIG. 2, as a result of which the vent is pierced at the orbicular muscle 26 by the pins 20 and is held fast between contacting surface 11 of the cutter 14 and contacting surface 5 of the end portion 4 of the centering pin 2.

The control of the rotation of the cutter 14 and the centering pin 2 may, for example, be such that the rotation is ended as soon as the incision is completed.

Figure 4:
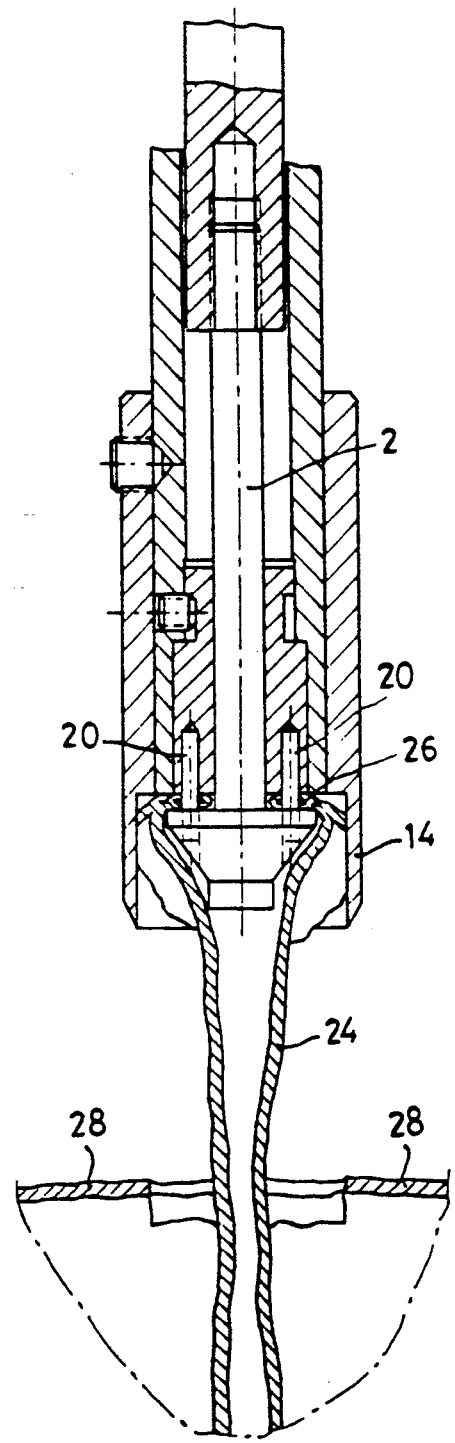

FIG. 4 then illustrates the pulling of the end of the rectum 24 out of the opening produced by the incision, the orbicular muscle 26 being held in the same way as in FIG. 3 by means of the pins 20. For reaching of the position shown in FIG. 4, the centering pin 2 and the cutter 14 are moved in their entirety upwards.

Figure 5:
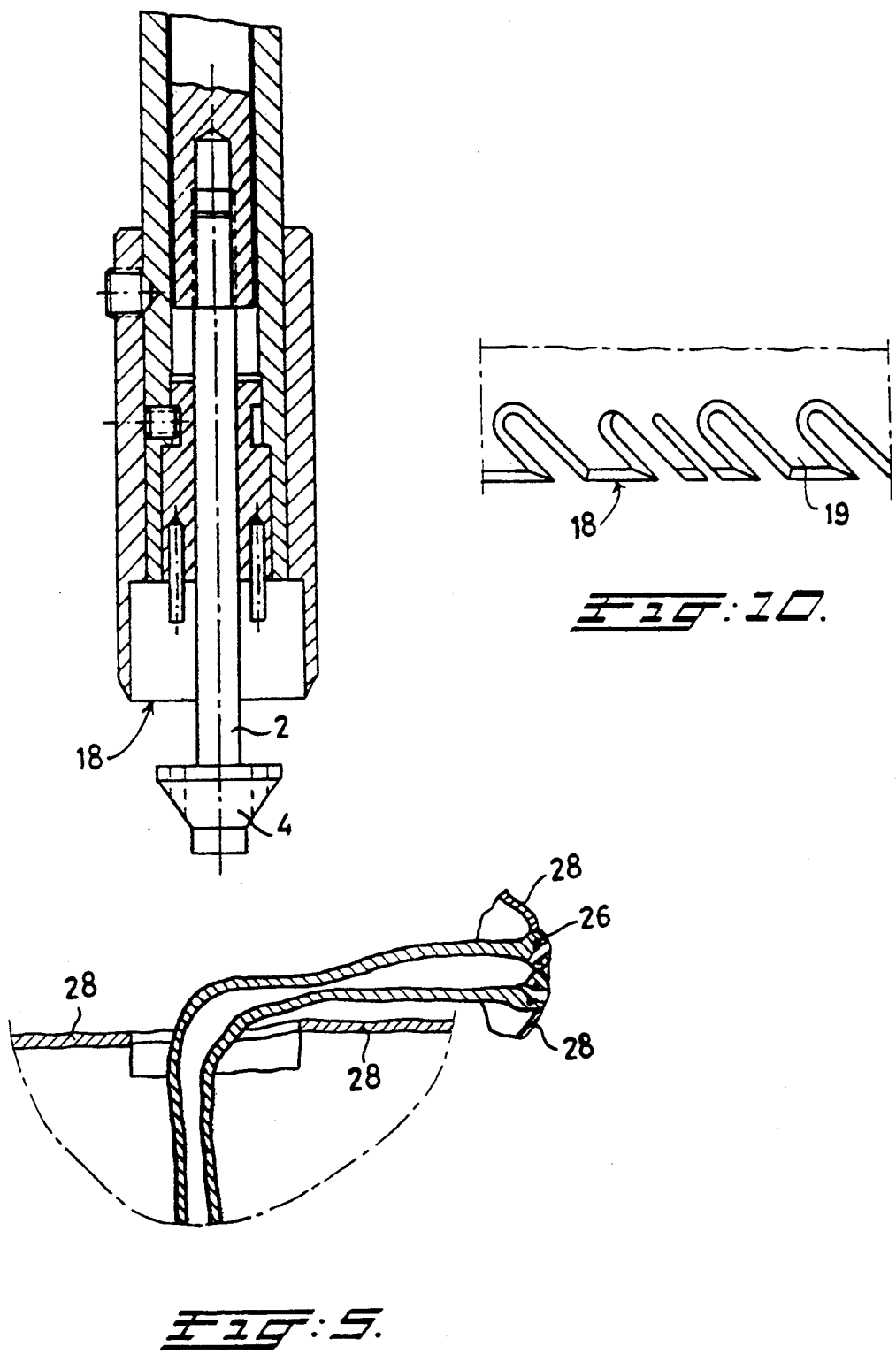

During this movement, the centering pin 2 can be moved downward relative to the cutter 14, as a result of which the end of the rectum 24 is no longer held on the centering pin end portion 4 slides off it due to the amount of stress in the rectum 24. The situation then arising is shown in FIG. 5: the end of the rectum 24 lies loose on the skin surface 28, and the cutter 14 and the centering pin 2 are situated again in the initial position shown in FIG. 1. A next bird can then be processed.

Figures 6, 7:
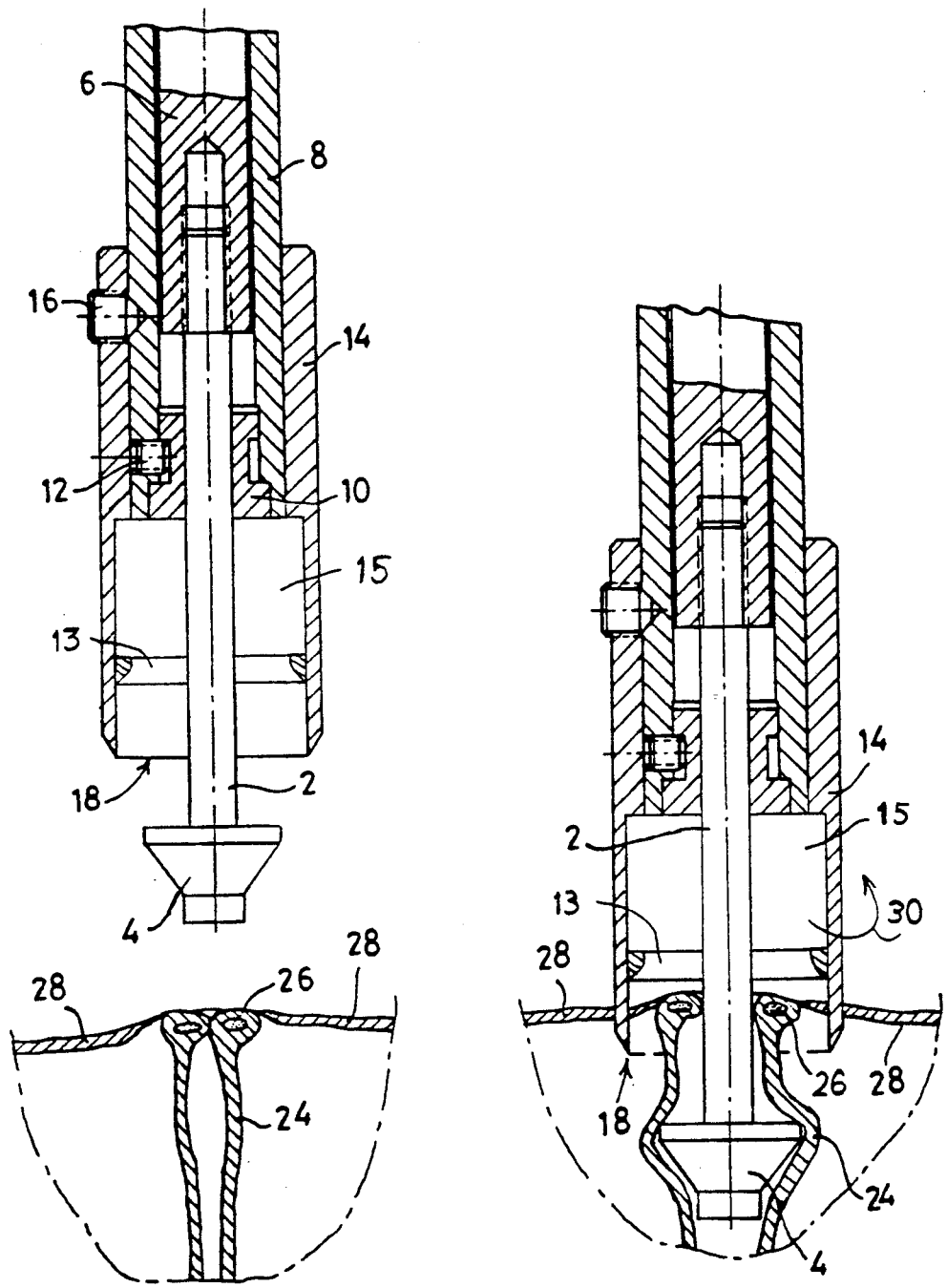

In the embodiment illustrated in FIG. 6 the cutter 14 comprises a large chamber 15 in which an annular protuberance 13 along the inner circumference thereof is provided. The mutual position of the cutter 14 and the centering pin 2, and their position relative to the bird's vent to be cut out are identical to the respective positions shown in FIG. 1. However, in FIGS. 6-9 a difference to be noted is that plug 10 is movable relative to end portion 4 in the axial direction as well as the tangential direction.

In FIG. 7, like shown in FIG. 2, both the cutter 14 and the centering pin 2 have moved down as a whole when compared to the situation of FIG. 6. During the downward movement the end portion 4 of the centring pin 2 first of all penetrates into the rectum 24, after which on continuation of the movement the cutting edge 18 of the cutter 14 rotating in the direction of the arrow 30 cuts through the skin 28 into the underlying tissue around the vent of the bird. The orbicular muscle 26 grips round the centering pin 2.

In FIG. 8 the centering pin 2 is moved up relative to the position shown in FIG. 7, as a result of which the vent is held fast between protuberance 13 and contacting surface 17 of centering pin end portion 4. The device is designed in such a way that the difference between the inner radius of the protuberance 13 and the largest outer radius of the centering pin end portion 4 is smaller than the thickness of the orbicular muscle 26, so that in the situation shown in FIG. 8 the vent cannot slide off the centering pin end portion 4.

The control of the rotation of the cutter 14 and the centering pin 2 may, for example, be such that the rotation is ended as soon as the incision is completed.

FIG. 9 then illustrates the pulling of the end of the rectum 24 out of the opening produced by the incision, the orbicular muscle 26 being held in the same way as in FIG. 8 by means of the protuberance 13. For reaching of the position shown in FIG. 9, the centering pin 2 and the cutter 14 are moved in their entirety upwards.

During this movement, the centering pin 2 can be moved downward relative to the cutter 14, as a result of which the end of the rectum 24 is no longer held on the centering pin end portion 4 and slides off it due to the amount of stress in the rectum 24. The end of the rectum 24 then lies loose on the skin surface 28, and the cutter 14 and the centering pin 2 are situated again in the initial position shown in FIG. 6. A next bird can then be processed.

FIG. 10 shows an embodiment of the cutting edge 18 of the cutter 14, in particular a cutting edge with slanting serrations. The edges of the teeth 19 are provided with a sharp cutting edge not only at the cutting edge 18, but also at the longitudinal sides. The cutting edge design shown is particularly suitable for making an incision around the vent in only a few, for example two, turns, so that the end of the rectum cannot be damaged by excessive twisting during cutting.

While the invention has been described and illustrated in its preferred embodiments, it should be understood that departures may be made therefrom within the scope of the invention, which is not limited to the details disclosed herein.

What is claimed is:

1. A device for making an incision around the vent of a slaughtered bird and pulling the end of the rectum out of the opening thus made, comprising:
    a centering pin for insertion into the vent of the bird, which centering pin is movable relative to the bird, and is provided with a thickened end portion; and
    a cylindrical rotary cutter with an annular cutting edge, which cutter is movable relative to the bird and is movable coaxially relative to the centering pin,
    the device further comprising:
    one or more holding elements which are recessed relative to the cutting edge and which can cooperate with a contacting surface of the thickened centering pin end portion situated opposite them for holding the vent between these elements and contacting surface near or at the orbicular muscle, wherein said holding elements are made in the form of one or more pins which project axially with the cutter towards its cutting edge, and which are intended for piercing the vent near or at the orbicular muscle.

2. A device according to claim 1, wherein the drive of the cutter is designed in such a way that the cutter carries out a small number of turns during the cutting operation.

3. A device according to claim 1, wherein the contacting surface of the centering pin end portion is provided with one or more recesses for receiving the pins.

4. A device according to claim 3, wherein the recesses in the contacting surface of the centering pin end portion consist of holes, and the contacting surface of the centering pin end portion is set up in a fixed manner in the tangential direction relative to the pins.

5. A device for making an incision around the vent of a slaughtered bird and pulling the end of the rectum out of the opening thus made, comprising:
    a centering pin for insertion into the vent of the bird, which centering pin is movable relative to the bird, and is provided with a thickened end portion; and
    a cylindrical rotary cutter with an annular cutting edge, which cutter is movable relative to the bird and is movable coaxially relative to the centering pin,
    the device further comprising:
    one or more holding elements which are recessed relative to the cutting edge and which can cooperate with a contacting surface of the thickened centring pin end portion situated opposite them for holding the vent between these elements and contacting surface near or at the orbicular muscle, wherein said holding elements consist of a principally annular protuberance along the inner circumference of the cutter.

6. A device according to claim 5, wherein the difference between the inner radius of the protuberance and the largest outer radius of the thickened centering pin end portion is smaller than the thickness of the orbicular muscle.

7. A device for making an incision around the vent of a slaughtered bird and pulling the end of the rectum out of the opening thus made, comprising:
    a centering pin for insertion into the vent of the bird, which centering pin is movable relative to the bird, and is provided with a thickened end portion; and
    a cylindrical rotary cutter with an annular cutting edge, which cutter is movable relative to the bird and is movable coaxially relative to the centring pin,
    the device further comprising:
    one or more holding elements which are recessed relative to the cutting edge and which can cooperate with a contacting surface of the thickened centring pin end portion situated opposite them for holding the vent between these elements and contacting surface near or at the orbicular muscle, wherein said holding elements are fixed to the cutter.

8. A device for making an incision around the vent of a slaughtered bird and pulling the end of the rectum out of the opening thus made, comprising:
    a centering pin for insertion into the vent of the bird, which centering pin is movable relative to the bird, and is provided with a thickened end portion; and
    a cylindrical rotary cutter with an annular cutting edge, which cutter is movable relative to the bird and is movable coaxially relative to the centring pin,
    the device further comprising:
    one or more holding elements which are recessed relative to the cutting edge and which can cooperate with a contacting surface of the thickened centring pin end portion situated opposite them for holding the vent between these elements and contacting surface near or at the orbicular muscle, wherein said holding elements are provided in a fixed position relative to the cutting element.

* * * * *